April 10, 1951 H. J. HORN 2,548,107
STAMPED METAL VEHICLE WHEEL
Filed June 18, 1948 2 Sheets-Sheet 2

INVENTOR.
HARRY J. HORN
BY
ATTORNEYS.

Patented Apr. 10, 1951

2,548,107

UNITED STATES PATENT OFFICE 2,548,107

STAMPED METAL VEHICLE WHEEL

Harry J. Horn, Lansing, Mich., assignor to Motor Wheel Corporation, Lansing, Mich., a corporation of Michigan Application June 18, 1948, Serial No. 33,778

5 Claims. (Cl. 301—9)

This invention relates to stamped metal vehicle wheels which are demountable and which can be mounted either singly or dual.

The vehicle wheel present used either singly or dual for heavy duty such as on trucks is either a forging or a rolled form disc wherein the bolting on flange is a flat annular member thicker than the body part of the disc which is attached to the rim of the wheel. In the vehicle wheel presently used it is necessary to make the bolting on flange considerably thicker than the body part of the disc in order to obtain the strength necessary for such heavy duty wheel.

The present invention contemplates a stamped or pressed disc type metal vehicle wheel wherein the disc is of uniform thickness throughout both the bolting on flange and the body part of the disc which attaches to the wheel rim.

In my stamped metal wheel, the thickness of which is considerably less than that of the present forged or rolled formed disc wheel, I obtain the strength necessary in the bolting on flange by stamping this flange so that it has an irregular contour which is not flat. By thus forming the bolting on flange in my wheel the strength of the flange is increased due to the fact that the load stresses are properly distributed. I also arrange the bolting on flange of my wheel so that when my wheels are mounted dual the bolting on flanges are pre-loaded or flexed when the wheel bolts or cap screws are turned tightly into place thereby providing a very advantageous mounting condition.

Figure 2:
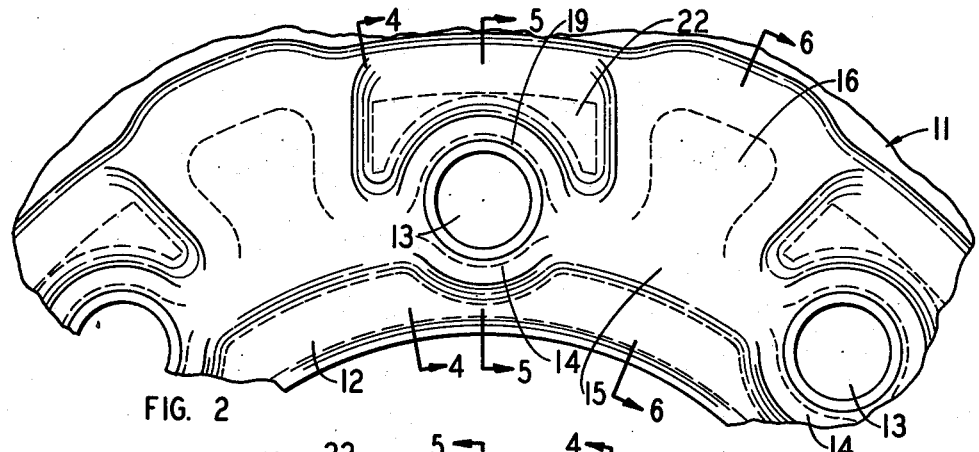
Fig. 2 is a fragmentary elevational view showing the outer or convex side of the bolting on flange of my wheel.
Figure 3:
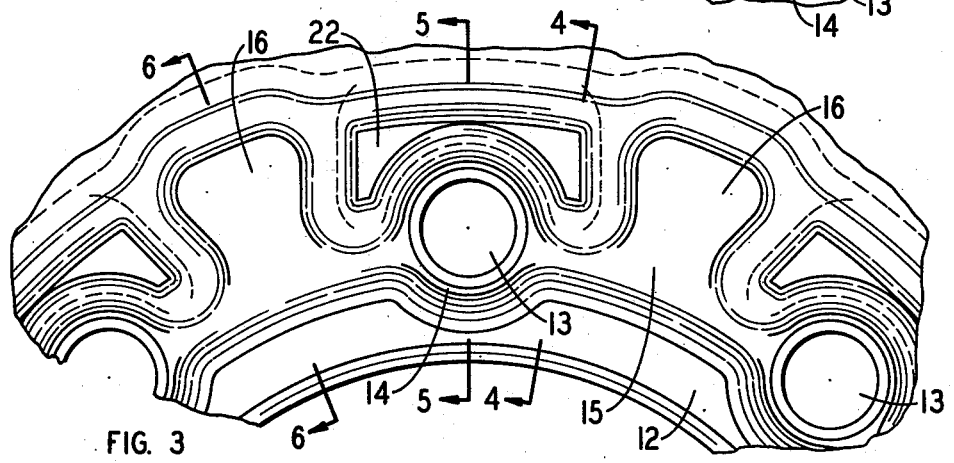
Fig. 3 is a fragmentary elevational view showing the inner or concave side of the bolting on flange of my wheel.
Figures 4, 5, 6:
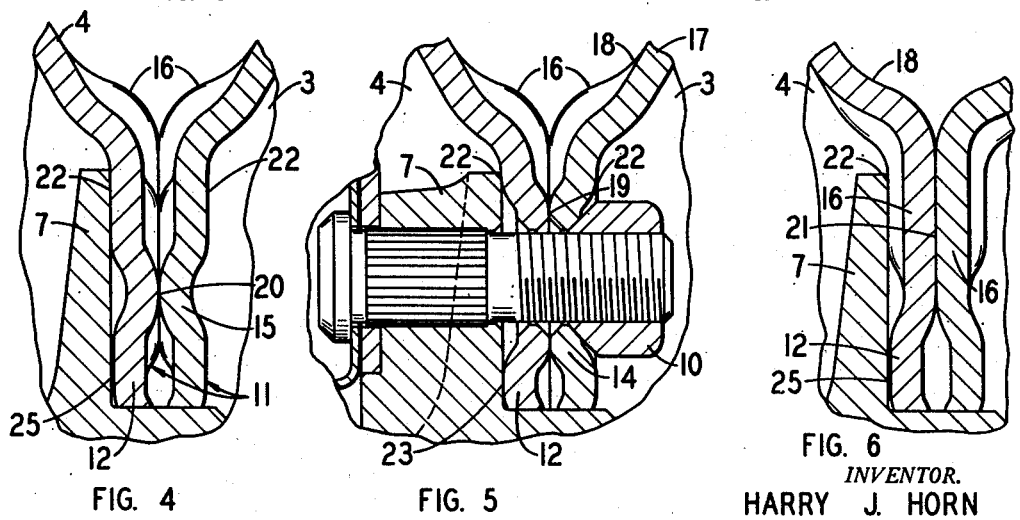

Figs. 4, 5 and 6 are cross sections through the bolting on flange of the wheel along the lines 4—4, 5—5, and 6—6 of Figs. 2 and 3 when the wheels are mounted dual.

Figure 1:
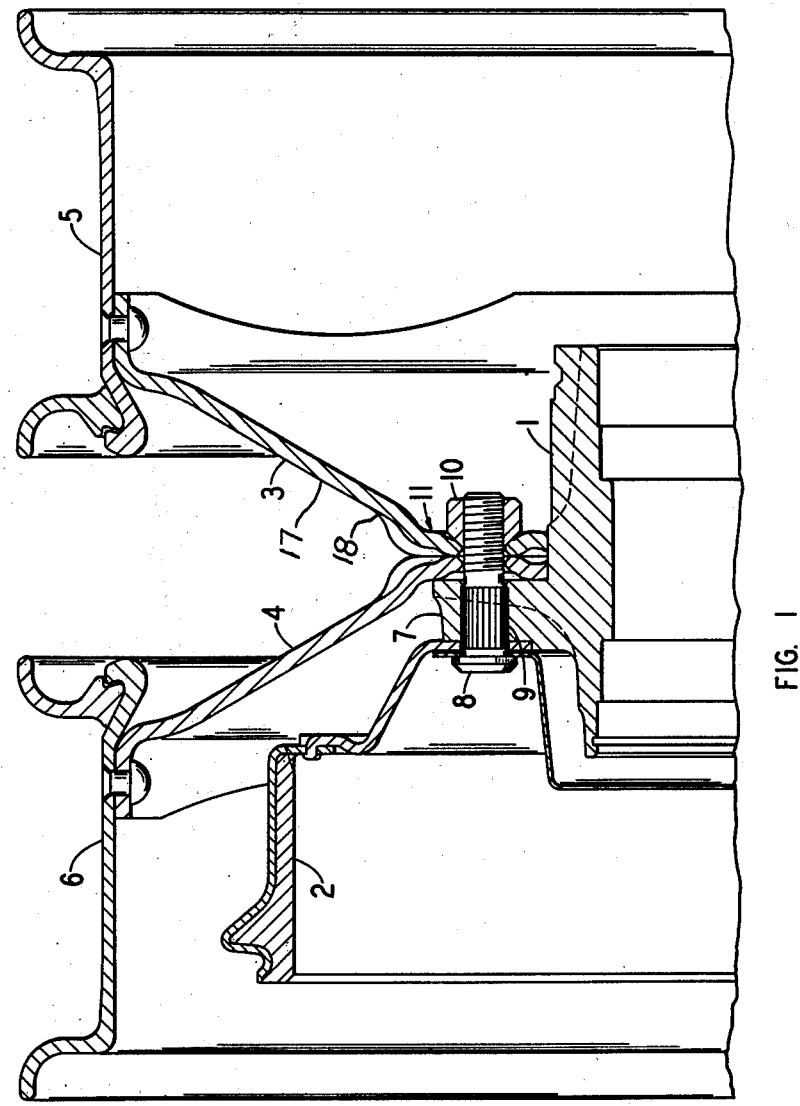
Fig. 1 is a fragmentary radial section showing my dual wheel assembly secured to the wheel hub.

In Fig. 1 of the drawings there is shown a dual wheel assembly consisting of a hub 1, brake drum 2, wheel bodies 3 and 4 which are identical and of the dished disc type, and rims 5 and 6. The wheel bodies 3 and 4 are secured to the hub flange 7 by bolts 8, which pass through openings 9 in the hub flange, and nuts 10, or in any other suitable conventional manner such, for example, as by means of cap screws each having a head of the same configuration as the nut 10 and screwed into the hub flange. The two wheels shown mounted on hub 1 in Fig. 1 are identical, each wheel being in reverse position with respect to the other.

The bolting on flange of my wheel will be generally designated 11 and is shown in detail in Figs. 2 to 6.

The wheel is provided with a central opening for reception of the hub 1 and the bolting on flange is provided around its inner circumference with a circumferential bead or seat 12. The circumferentially spaced bolt holes are designated 13 and are coplanar. Each bolt hole on the convex face of the wheel, Fig. 2 is surrounded by a circular embossment 14. The convex face of the bolting on flange, as viewed in Fig. 2, is provided with an integral circumferential embossment which, for purposes of description, can be referred to by its component parts; namely, embossment 14 extending completely about each hole 13, interconnecting embossment 15 which merges at each end with embossments 14 and at its central portion merges with embossment 16 which flares radially outwardly from embossment portion 15 and merges into the angular portion 17 of the wheel body as at 18.

As shown in Fig. 2, the convex faces of embossments 14, 15 and 16 are shown. The high point of embossment 14 is around circumference 19 of each opening 13. The highest point of each embossment 15 extends along its median circumferential line and the highest point of embossment portion 16 extends along its median radial line. The highest points of all these embossment portions 14, 15 and 16 are in the same plane. The high point of embossment portion 15 is designated 20, Fig. 4, and the high point of embossment portion 16 is along the line 21, Fig. 6. As viewed in Fig. 2, the depressed areas in bolting on flange 11 will be in bead 12 and the generally arch shaped area 22 extending about the outer half circumference of each opening 13.

Now referring to Fig. 3 where the bolting on flange is viewed from the concave side of the wheel, embossment portions 14, 15 and 16 now show up as depressions and the high areas are constituted by the convex face of bead 12 which extends around the central opening in the wheel body and the arch shaped embossment 22. Thus, the bearing surfaces of the bolting on flange is constituted by the high areas 22 and the median circumferential line 23 of bead 12, Fig. 5.

When the wheels are mounted in dual relation, as shown in Figs. 1 and 4 to 6, the wheel body 3 is reversed in relation to the wheel body 4. As shown in Figs. 4 and 6, the nuts 10 have not been drawn tight and therefore there is a clearance 25 between bead 12 and the hub flange 7. Referring to Fig. 5, it will be noted that on the concave side of the wheel the high area of bead 12 bears against the hub flange 7. In the area of line 4—4, the concave face of the inner wheel bears against hub flange 7 throughout the high facial area of embossment 22 and the same is true in the area about opening 13 along the line 5—5. The inner wheel 4 along the area of line 6—6 does not bear against the hub flange 7 because the concave side of embossments 16 face the hub flange and each embossment 16 is flanked on each side by high embossments 22. The outer and inner wheels 3 and 4 in the area of line 4—4 bear against each other along the high areas 20 of embossed portions 15 and are spaced from each other between embossments 22 but, as shown in Fig. 6, the embossments 16 abut each other between holes 13 and between spaced embossments 22. In the area of line 5—5, as shown in Fig. 5, the circumferential high portions 19 of embossments 14 about openings 13 contact or bear against each other. Further, as shown in Fig. 5, when the nuts 10 are drawn down, the bolting on flange of the inner wheel 4 is flexed around embossment 22 and clearance 25 is taken up and simultaneously the bolting on flange of the outer wheel 3 also flexes about the bearing point between embossments 16 to thus place the bolting on flange of the outer wheel in stressed condition. Thus, the bolting on flanges of both the inner and outer wheels are pre-loaded which is highly desirable from the standpoint of taking up side thrusts on the wheel bodies in actual operation. Due to this pre-loading any side stresses or strains, that is, stresses or strains in the axial direction of the wheel body, are distributed over the continuous circumferential portion of the wheel body along the area of contact between the bolting on flange of the inner wheel and the hub flange and similar stresses on the outer wheel body 3 are distributed along the entire area of contact at the junction of the wheel body portion and the bolting on flange and thus in both wheels these side stresses or strains are not concentrated in the areas of contact between the nuts 10 and the wheel body.

From the above it will be noted that the bolting on flange has an embossment extending continuously about the central wheel opening and projecting axially in one direction; namely, toward the reader as viewed in Fig. 2, which consists of the ring-like embossments about holes 13, the arc embossments 15 extending between embossments 14 and concentric with the center of the wheel and the radially outwardly projecting flared portions 16. The bolting on flange of the wheel also has embossments projecting in the axially opposite direction, that is, toward the reader as viewed in Fig. 3, and these embossments comprise the arch shaped embossments 22 positioned radially outwardly of the embossments 14 and the circular embossment or bead 12 extending about the circumference of the central wheel opening and inwardly of the embossed portions 14 and 15.

I claim:

1. A stamped metal vehicle wheel comprising a wheel body having an integral bolting on flange provided with a plurality of circumferentially spaced holes located in a planar zone of said bolting on flange, said bolting on flange having a central opening adapted to receive a hub, said bolting on flange having a continuous embossment extending about the circumference of said central opening and projecting axially in one direction, said embossment comprising the following integrated portions; namely, ring-like portions extending completely about each of said holes, arc portions concentric with the center of the wheel body and joining said ring-like portions and portions extending radially outwardly of said arc portions intermediate the ring-like portions, the high areas of the aforesaid embossed portions being coplanar with the high area of each ring-like portion extending around its respective hole, the high area of each arc portion extending along its median circumferential line, and the high area of each radial portion extending along its median radial line, said bolting on flange also having embossments projecting in the axially opposite direction; namely, embossments extending about substantially the radially outer half circumference of each of said ring-like embossed portions and a bead embossment extending about the central opening and positioned between the central opening and the said ring-like and arc portions of the radially opposite projecting embossment.

2. The combination claimed in claim 1 wherein the bolting on flange is positioned generally in a plane perpendicular to the axis of the wheel and the remainder of the wheel body is generally convex.

3. The combination claimed in claim 2 wherein the wheel body is of substantially uniform thickness.

4. The combination claimed in claim 3 wherein the said embossed portions extending radially outwardly of said arc portions intermediate the ring-like portions are flared radially outwardly.

5. The combination claimed in claim 4 wherein said radially flared embossed portions extend into and merge with the convex portion of said wheel body.

HARRY J. HORN.

REFERENCES CITED

The following references are of record in the file of this patent:

UNITED STATES PATENTS

| Number | Name | Date |
|---|---|---|
| Re. 21,960 | Stough | Nov. 25, 1941 |
| 2,130,392 | Horn | Sept. 20, 1938 |
| 2,317,311 | Stough | Apr. 20, 1943 |
| 2,407,749 | Sinclair | Sept. 17, 1946 |